H. S. CADBY.
DISH.
APPLICATION FILED JAN. 18, 1916.
1,220,495.
Patented Mar. 27, 1917.
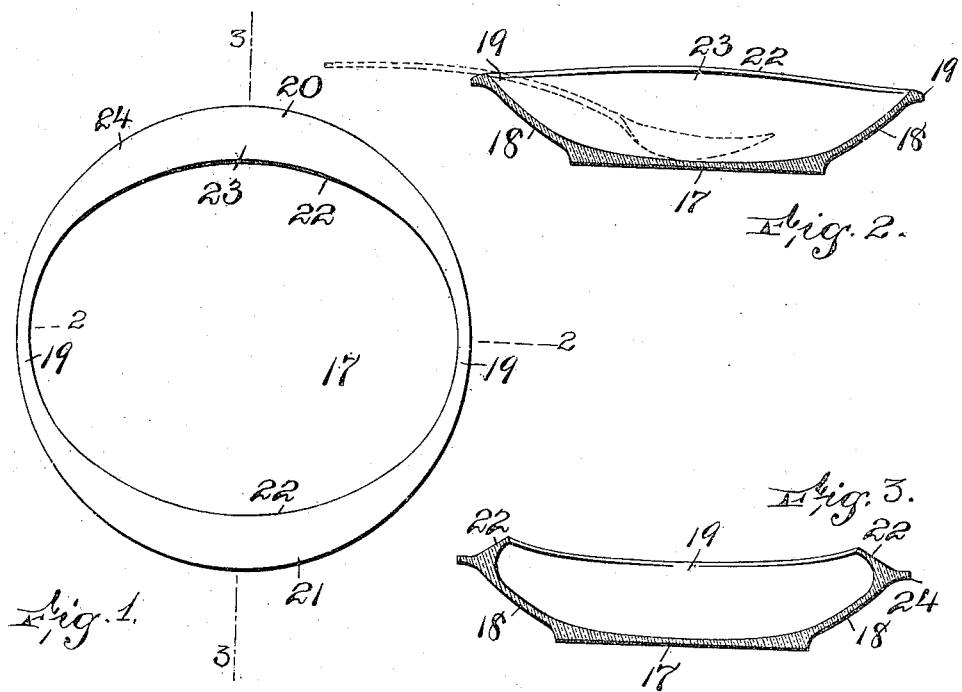
INVENTOR
Harry S. Cadby,
BY
Dyke & Caufield.
ATTORNEYS.

UNITED STATES PATENT OFFICE.

HARRY S. CADBY, OF ARLINGTON, NEW JERSEY.

DISH.

1,220,495.                    Specification of Letters Patent.    Patented Mar. 27, 1917.

Application filed January 18, 1916. Serial No. 72,704.

*To all whom it may concern:*

Be it known that I, HARRY S. CADBY, a citizen of the United States, and a resident of Arlington, county of Hudson, and State of New Jersey, have invented certain new and useful Improvements in Dishes, of which the following is a specification.

This invention relates to an improved dish and is designed to provide a dish that is conveniently used for soups, puddings, berries and other edibles, being adapted to make it convenient for use.

The invention is further designed to provide a dish of this kind of such form that the dishes can be stacked, which is sometimes essential, and always desirable, and in which the use of a spoon is made easy and convenient.

The dish is also adapted for depositing the contents of the dish into a spoon by reason of a flange on the top of the dish, this flange extending inwardly and thus forming a dam, the inner face of the side wall of the dish immediately below the flange being curved in a substantially continuous curve so that when the bowl of a spoon is passed up this curved wall its progress is practically uninterrupted by any sharp changes in the curvature of the wall.

Another object of the invention is the provision of a dish in which the flanged part is cut away or reduced at selected points on the rim so that the shank or handle of a spoon passing through these points permits the substantially horizontal use of a spoon, the flanges projecting above the plane of the lowered or reduced parts of the side wall of the dish.

Another object of the invention is the provision of outwardly extending flanges which make it easier to lift the dish from the stack when the dishes are stacked, which provides points by means of which the dish can be lifted if its contents are hot, without danger of burning the fingers by actual contact with the side walls of the dish, and to strengthen the dish so that its inwardly extending flange is reinforced.

Another object of the invention is to provide an inwardly turned flange to form a dam, which flange is so disposed that it resists chipping when the dishes are stacked, and which is more adapted to support the stack of dishes by reason of the flange being upwardly and inwardly inclined so that the weight subjects the flange to a strain longitudinally of its thickness and not transversely thereon.

In the illustration I have shown an embodiment of my invention, but it will be evident that different forms can be devised within the scope of the invention, and that the dishes can be proportioned and ornamented and otherwise treated while still embracing the essential points of the invention.

In the drawing, Figure 1 is a top view of one form of dish embodying my invention. Fig. 2 is a section on line 2—2 in Fig. 1, and Fig. 3 is a section on line 3—3 in Fig. 1.

The dish shown in said drawing has a body portion 17 with the side walls 18, these side walls being preferably upwardly inclined and extending upward any desired distance, the sides 19 being arranged without any material flange extending in an inward direction and being relatively lower than the rest of the top edge of the dish. These sides 19 merge into the front 20 and the back 21 by means of an inwardly projecting flange 22 which is highest and widest at its center, as at 23, and becomes narrower toward its ends, and inclines downwardly toward its ends, as will be more particularly evident from Figs. 2 and 3. This structure provides a substantially high dam at the front and back of the dish upon one diameter thereof and relatively low parts at the sides as at 19 at the ends of the diameter at right angles to the first named diameter, so that a spoon shown in dotted lines in Fig. 2 can be handled in a substantially horizontal position and need not be tilted upward at the handle end, since the dam or inwardly turned flange 22 is higher than the sides and is therefore well adapted for depositing food from the dish into the spoon. The dish can also be provided with an outwardly extending flange 24, the flange 24 being arranged around the base of the inwardly extending flange 22 and merging into the side walls of the dish at 19 so as to provide a substantially narrow rim at the sides.

The dishes as shown in Figs. 1, 2 and 3 can be stacked, and the flanges 22 being inclined upwardly and inwardly, the strain comes on the flanges in such direction as not to be liable to result in breakage.

Having thus described my invention, I claim:

1. A dish comprising a bottom portion, side walls extending upwardly therefrom, said walls being comparatively low and outwardly directed at the ends of one diameter, and a substantially horizontal outwardly directed flange extending about the dish at substantially the height of said side walls, said side walls being extended to form raised inwardly directed flanges at the ends of the diameter at right angles to the first named diameter, said flanges tapering off each way toward the lower side portions.

2. A dish comprising a substantially flat bottom part adapted to rest directly on a table or other support, side walls extending upwardly from said bottom part, said side walls being highest at opposite sides and lowest at intermediate points and having inwardly directed flanges at their highest portion, and a substantially horizontal outwardly directed flange extending entirely about the dish at substantially the lowest height of the side walls.

In testimony that I claim the foregoing, I have hereto set my hand, this 15th day of January, 1916.

HARRY S. CADBY.

Copies of this patent may be obtained for five cents each, by addressing the "Commissioner of Patents, Washington, D. C."